United States Patent
Love

(10) Patent No.: US 12,311,905 B2
(45) Date of Patent: May 27, 2025

(54) WORK VEHICLE BRAKE ENERGY MANAGEMENT SYSTEM

(71) Applicant: Deere & Company, Moline, IL (US)

(72) Inventor: Galen R. Love, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 444 days.

(21) Appl. No.: 17/844,983

(22) Filed: Jun. 21, 2022

(65) Prior Publication Data

US 2023/0406273 A1    Dec. 21, 2023

(51) Int. Cl.
    *B60T 8/171*    (2006.01)
    *B60K 35/00*    (2006.01)
        (Continued)

(52) U.S. Cl.
    CPC .............. *B60T 8/171* (2013.01); *B60K 35/00* (2013.01); *B60T 7/12* (2013.01); *B60T 17/22* (2013.01); *F16D 66/00* (2013.01); *B60K 35/28* (2024.01); *B60K 2360/178* (2024.01); *B60T 2250/04* (2013.01); *B60T 2270/402* (2013.01); *B60T 2270/88* (2013.01); *F16D 65/853* (2013.01);
        (Continued)

(58) Field of Classification Search
    None
    See application file for complete search history.

(56) References Cited

U.S. PATENT DOCUMENTS 6,456,922 B1 * 9/2002 Gamberg ............ B60T 8/17636
                                                      180/197
6,464,056 B1   10/2002 Lowell et al.
                        (Continued)

FOREIGN PATENT DOCUMENTS

CN      105564468 B       5/2016
CN      107303820 B  *    6/2019
                        (Continued)

OTHER PUBLICATIONS

Final Office Action issued in U.S. Appl. No. 17/845,013 dated Apr. 18, 2023 (43 pages).
(Continued)

*Primary Examiner* — Justin S Lee
(74) *Attorney, Agent, or Firm* — KLINTWORTH & ROZENBLAT IP LLP

(57) ABSTRACT

A work vehicle brake energy management system includes an axle speed sensor for monitoring a rotational speed of a work vehicle axle, a friction brake mechanism controllable to slow rotation of the work vehicle axle, a brake pressure sensor for measuring a brake apply pressure of the friction brake mechanism, and computer-readable memory. A processing subsystem is coupled to the axle speed sensor, to the brake pressure sensor, and to the computer-readable memory. The processing subsystem is configured to: (i) utilize data from the axle speed sensor and from the brake pressure sensor to detect brake overtemperature events during which an internal brake temperature of the friction brake mechanism exceeds at least a first critical temperature threshold stored in the computer-readable memory; and (ii) perform at least one predetermined brake overtemperature action in response to detection of a brake overtemperature event.

18 Claims, 6 Drawing Sheets

(51) Int. Cl.
  *B60T 7/12* (2006.01)
  *B60T 17/22* (2006.01)
  *F16D 66/00* (2006.01)
  *B60K 35/28* (2024.01)
  *F16D 65/853* (2006.01)

(52) U.S. Cl.
  CPC .. *F16D 2066/001* (2013.01); *F16D 2066/006* (2013.01)

(56) References Cited

U.S. PATENT DOCUMENTS

| | | | |
|---|---|---|---|
| 6,752,742 | B2 | 6/2004 | Shigeta et al. |
| 6,789,657 | B2 | 9/2004 | Schrand et al. |
| 6,905,180 | B2 | 6/2005 | Mayer et al. |
| 6,942,055 | B2 | 9/2005 | Forsyth et al. |
| 8,740,741 | B2 | 6/2014 | Wood, Jr. et al. |
| 9,102,334 | B2 | 8/2015 | Anderson |
| 10,018,171 | B1 | 7/2018 | Breiner et al. |
| 11,525,490 | B1 * | 12/2022 | Mahmud ................. F16D 48/10 |
| 2019/0391098 | A1 * | 12/2019 | Park ..................... G01N 27/045 |
| 2020/0362540 | A1 * | 11/2020 | Hyodo ................. B60T 17/221 |
| 2021/0086557 | A1 | 3/2021 | Love et al. |
| 2022/0034379 | A1 * | 2/2022 | Matsui ................... F16D 66/021 |
| 2023/0018720 | A1 * | 1/2023 | Kim ..................... B60W 30/143 |
| 2023/0052374 | A1 * | 2/2023 | Woerner ................. B60T 8/885 |

FOREIGN PATENT DOCUMENTS

| | | | | | |
|---|---|---|---|---|---|
| CN | 105987167 | B | | 10/2019 | |
| CN | 111853226 | A | | 10/2020 | |
| DE | 10012448 | A1 | | 10/2001 | |
| DE | 10219039 | A1 | | 11/2003 | |
| DE | 10331831 | A1 | | 2/2004 | |
| DE | 10350936 | A1 | | 5/2004 | |
| DE | 102005045488 | A1 | | 4/2006 | |
| DE | 102009032265 | A1 | | 1/2011 | |
| DE | 102017101510 | A1 | | 8/2017 | |
| DE | 102016115275 | A1 | | 2/2018 | |
| DE | 102020000876 | A1 | | 10/2020 | |
| DE | 102021205068 | A1 | | 11/2022 | |
| EP | 1359078 | A1 | * | 11/2003 | ............ B60T 8/1708 |
| JP | 2003285993 | A | * | 10/2003 | |
| JP | 2004224510 | A | * | 8/2004 | |
| JP | 2007050735 | A | * | 3/2007 | |
| WO | WO-9621145 | A1 | * | 7/1996 | ............. B60T 17/22 |
| WO | WO-2005054026 | A1 | * | 6/2005 | ............. B60T 17/22 |

OTHER PUBLICATIONS

Non-Final Office Action issued in U.S. Appl. No. 17/845,013 dated Dec. 13, 2022 (33 pages).
German Search Report issued in application No. DE102023110976.6 dated Jan. 10, 2024 (06 pages).

* cited by examiner

WORK VEHICLE BRAKE ENERGY MANAGEMENT SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to brake energy management systems for work vehicles.

BACKGROUND OF THE DISCLOSURE

A primary metric impacting work vehicle efficiency, from both temporal and cost standpoints, is work vehicle uptime. Work vehicle uptime increases as work vehicle maintenance needs are lessened, whether through the development of increasingly robust system components or through improved operator guidance in piloting work vehicles to avoid accelerated component wear. This is particularly true in the context of critical work vehicle systems, such as hydraulic brake and powertrain systems, onboard high payload work vehicles. Extensive engineering efforts and the development of enhanced operator interfaces have improved work vehicle durability and capabilities over time, while further reducing system maintenance needs. Nonetheless, industry demands continue to seek further advancements in managing work vehicle maintenance demands, while facilitating optimal operation of critical work vehicle systems for further gains in work vehicle uptime. So too are innovations increasingly sought introducing additional intelligence into the strategic automation of work vehicle functions and supporting semi-autonomous or fully autonomous work vehicle operation.

SUMMARY OF THE DISCLOSURE

Brake energy management systems for deployment onboard work vehicles are disclosed. In various embodiments, the brake energy management system includes an axle speed sensor for monitoring a rotational speed of a work vehicle axle, a friction brake mechanism controllable to slow rotation of the work vehicle axle, a brake pressure sensor for measuring a brake apply pressure of the friction brake mechanism, and computer-readable memory. A processing subsystem is coupled to the axle speed sensor, to the brake pressure sensor, and to the computer-readable memory. The processing subsystem is configured to: (i) utilize data from the axle speed sensor and from the brake pressure sensor to detect brake overtemperature events during which an internal brake temperature of the friction brake mechanism exceeds at least a first critical temperature threshold stored in the computer-readable memory; and (ii) perform at least one predetermined brake overtemperature action in response to detection of a brake overtemperature event.

In at least some implementations, the processing subsystem is configured to detect brake overtemperature events utilizing data from the axle speed sensor to monitor a brake slip speed of the friction brake mechanism when applied to slow rotation of the work vehicle axle. The processing subsystem repeatedly estimates the internal brake temperature of the friction brake mechanism based, at least in part, on the brake slip speed and the brake apply pressure measured by the brake pressure sensor. Also, in such implementations, the processing subsystem may estimate the internal brake temperature of the friction brake mechanism further based on a temperature and/or flow rate of a coolant circulated through friction brake mechanism.

Further embodiments of the brake energy management system contain a hydraulic pump that, when active, circulates coolant through the friction brake mechanism. In such embodiments, the processing subsystem may be configured to increase the speed of the hydraulic pump to temporarily boost coolant flow through the friction brake mechanism when detecting a brake overtemperature event.

In embodiments in which the brake energy management system includes an in-cabin display device operably coupled to the processing subsystem and located in an operator cabin of the work vehicle, the predetermined brake overtemperature action may involve the generation of a notification of the brake overtemperature event on the in-cabin display device and/or another remotely-located display device, which communicates with the brake energy management system over a communications network. In this case, the processing subsystem may be configured to: (i) when detecting a brake overtemperature event, determine whether the internal brake temperature of the friction brake mechanism exceeds a second critical temperature threshold, which is stored in the computer-readable memory and which is greater than the first critical temperature threshold; (ii) if determining that the internal brake temperature of the friction brake mechanism is greater than the first critical temperature threshold and less than the second temperature threshold, generate a low level notification of the brake overtemperature event on the in-cabin display device; and (iii) if determining that the internal brake temperature of the friction brake mechanism is greater than the second temperature threshold, generate a high level notification of the brake overtemperature event on the in-cabin display device.

In still further implementations, when detecting a brake overtemperature event, the processing subsystem of the work vehicle brake energy management system may transmit reporting data indicative of the brake overtemperature event to a remote operations center over a communications network utilizing a wireless network interface. Further, in at least some embodiments, the processing subsystem may record data describing the brake overtemperature event into the computer-readable memory in response to detection of a brake overtemperature event.

In other implementations in which the work vehicle is equipped with an autobraking system, the processing subsystem may be configured to: (i) when determining the internal brake temperature exceeds the first critical temperature threshold, further determine whether the autobraking system is automatically braking the work vehicle axle utilizing the friction brake mechanism; and (ii) if the autobraking system is automatically braking the work vehicle axle, command the autobraking system to reduce the brake apply pressure of the friction brake mechanism. The processing subsystem may also command a secondary work vehicle system slow or help slow the work vehicle concurrently with reducing the brake apply pressure of the friction brake mechanism. Additionally, in at least some instances, the processing subsystem may further perform the steps or processes of: (iii) after commanding the autobraking system to reduce the brake apply pressure of the friction brake mechanism, determine if the internal brake temperature decreases below the first critical temperature threshold by a predetermined amount while autobraking is still desired; and (iv) reinstate full autobraking of the work vehicle if the internal brake temperature decreases below the first critical temperature threshold by the predetermined amount while autobraking is still desired.

Methods carried-out by a processing subsystem included in a brake energy management system are further disclosed. The methods may be carried, at least in part, to detect brake overtemperature events for a work vehicle having a work vehicle axle. In addition to the processing subsystem utilized to conduct the computer-implemented method or algorithm, the brake energy management system includes an axle speed sensor for monitoring a rotational speed of the work vehicle axle, a friction brake mechanism controllable to slow rotation of the work vehicle axle, and a brake pressure sensor for measuring a brake apply pressure of the friction brake mechanism. In embodiments, the method includes the steps or processes of: (i) utilizing data from the axle speed sensor to monitor a brake slip speed of the friction brake mechanism when applied to slow rotation of the work vehicle axle; (ii) estimating an internal brake temperature of the friction brake mechanism as a function of the brake slip speed and the hydraulic brake pressure measured by the brake pressure sensor; (iii) determining whether the internal brake temperature exceeds a first critical temperature threshold stored in the computer-readable memory; and (iv) performing at least a first predetermined brake overtemperature action if determining that the internal brake temperature exceeds the first critical temperature threshold.

In certain embodiments, the method further includes the steps or processes of: (i) when determining that the internal brake temperature exceeds the first critical temperature threshold, further determining whether an autobraking system is automatically braking the work vehicle axle utilizing the friction brake mechanism; and (ii) if the autobraking system is automatically braking the work vehicle axle, commanding the autobraking system to reduce the brake apply pressure of the friction brake mechanism. The method may also include the step or process of commanding another work vehicle system to slow the work vehicle concurrently with reducing the brake apply pressure of the friction brake mechanism. Additionally or alternatively, the method may include the steps of: (iii) after commanding the autobraking system to reduce the brake apply pressure of the friction brake mechanism, determining if the internal brake temperature decreases below the first critical temperature threshold by a predetermined amount while autobraking is still desired; and (iv) reinstating full autobraking of the work vehicle determine if the internal brake temperature decreases below the first critical temperature threshold by the predetermined amount while autobraking is still desired.

Embodiments of the method may also include generating a first visual notification of a brake overtemperature event on a display device associated with (e.g., located within a cabin of) the work vehicle if the internal brake temperature exceeds the first critical temperature threshold. In certain instances in which the first visual notification is presented as a low level brake overtemperature alert, the method may further include generating a high level brake overtemperature alert on the display device if the internal brake temperature exceeds a second critical temperature threshold greater than the first critical temperature threshold.

In still further realizations in which the brake energy management system contains a wireless network interface, the may include transmitting data to a remote operations center utilizing the wireless network interface indicating when the internal brake temperature exceeds the first critical temperature threshold. Finally, certain implementations of the method may include the step of storing health data in the computer-readable memory when the internal brake temperature exceeds the first critical temperature threshold. The health data may entail a duration of time over which the internal brake temperature exceeded the first critical temperature threshold.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
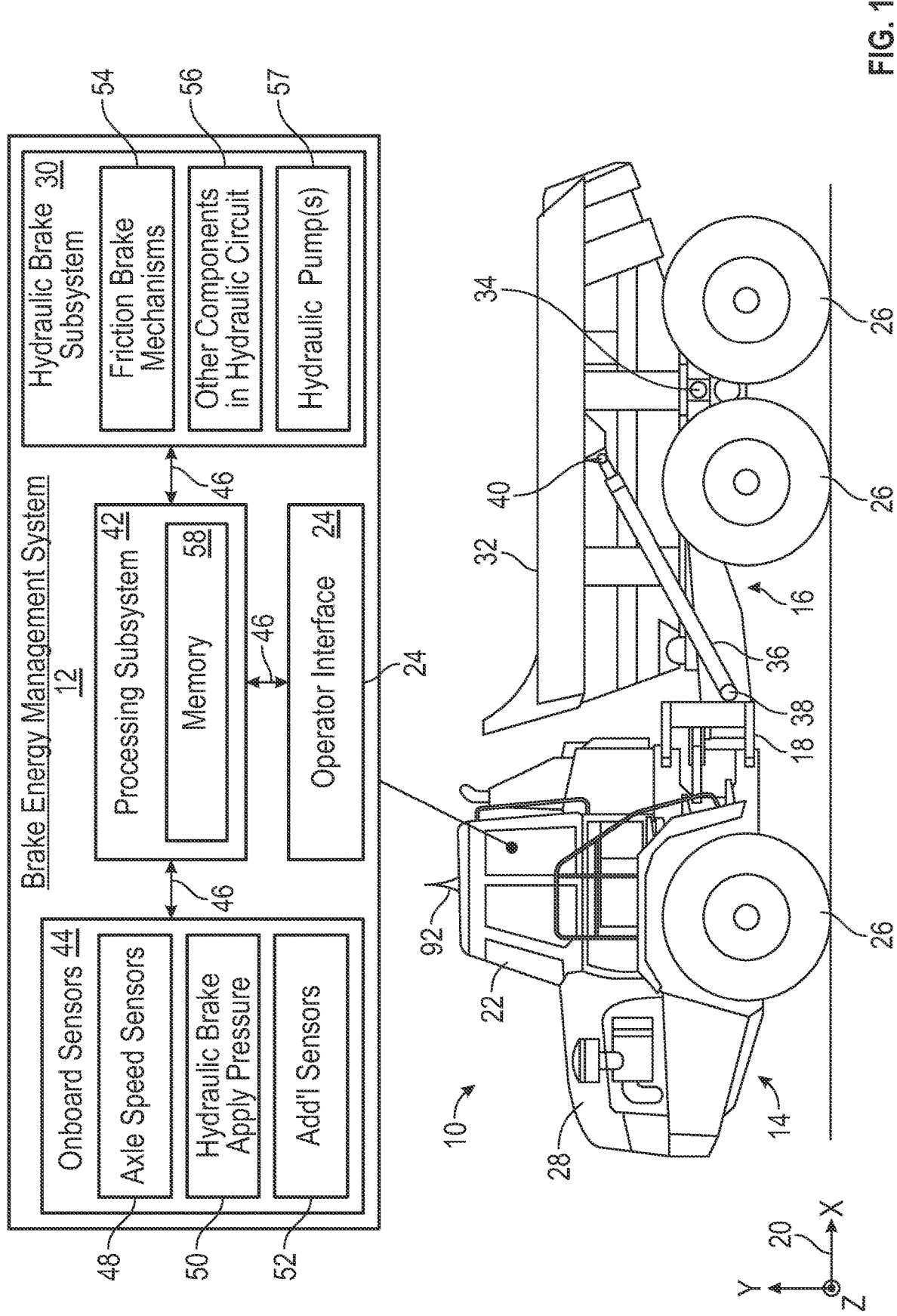
FIG. 1 is a side view of a work vehicle (here, an articulated dump truck) equipped with a brake energy management system (schematically shown), as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims. As appearing herein, the terms "lubricant" and "coolant" are utilized interchangeably in reference to a liquid lubricant that provides cooling when circulated through a friction brake assembly or mechanism.

Overview

Work vehicle uptime is directly impacted by the maintenance needs of critical work vehicle systems, such as hydraulic brake systems of the type commonly integrated into work vehicles utilized within agricultural, construction, mining, and forestry industries. A work vehicle hydraulic brake system may contain a number of friction brake devices or mechanisms, each including at least one rotating member and at least one rotationally-grounded member (collectively, the "brake clutch components"). A given rotating member may assume the form of, for example, a separator plate or friction disc, which is directly or indirectly mechanically coupled to a work vehicle axle to co-rotate therewith. The rotationally-grounded member(s), by comparison, can be plate-like structures or other features, which are rotationally grounded or affixed to the work vehicle chassis. The friction brake mechanism may further include at least one hydraulic piston, which can be controlled through hydraulic pressure variations to selectively press the brake clutch components into frictional engagement and apply the brake. Specifically, extension of the hydraulic piston may exert a relatively high clamp force across the brake clutch components to impede rotation of the rotatable clutch component(s), whether assuming the form of one or more separator plates, friction discs, or the like. This, in turn, impedes rotation of the work vehicle axle and the wheels mounted to the opposing axle ends, bringing about controlled deceleration of the work vehicle when in motion. When the brake apply pressure is subsequently relieved, the piston within the friction brake mechanism retracts (e.g., under the influence of a retractor spring), and the brake clutch components return to a tightly spaced, non-contacting position to permit the work vehicle axle and wheels to again rotate in a substantially free or unimpeded manner.

Proper maintenance of work vehicle hydraulic brake systems is of fundamental importance given the heavily-loaded conditions under which many work vehicles operate, the relatively high tonnage and payload-carrying capacity of many work vehicles, and the essential nature of the work vehicle brake systems. At the same time, it is desirable to reduce the frequency with which hydraulic brake systems require maintenance to minimize direct monetary costs associated with part replacement and service costs, as well as indirect costs attributable to excessive work vehicle downtime. The manner in which a work vehicle brake system is controlled, whether by a human operator, by an autobraking system, or through fully or semi-autonomous control schemes, directly impacts the lifespan and service requirements of the friction brake components. When excess energy is dissipated through a friction brake mechanism due to slippage despite the application of a relatively high brake apply forces, the excess energy is converted to waste heat by high frictional forces within the brake mechanism. Depending on the duration of such high energy slippage events, as well as the overall heat rejection capacity of the active liquid cooling system utilized to cool the brake mechanisms, undesirably elevated temperatures may occur locally within the friction brake mechanisms exacerbating component wear; and, in severe cases, reducing the effectiveness of the hydraulic brake system until servicing.

The development of highly elevated temperatures within friction brake mechanisms (referred to herein as "brake overtemperature events") often occurs in a highly abrupt or transitory manner, particularly when relatively large quantities of energy are dissipated through the hydraulically-actuated, friction brake mechanisms in an abbreviated period of time; e.g., due to abrupt brake application by a work vehicle operator when piloting a work vehicle carrying greater payloads and traveling at higher transport speeds. In many instances, an operator of the work vehicle remains unaware of the occurrence, severity, and impact of overtemperature events on braking capacity and the overall braking component health. Despite this, relatively few, if any conventional work vehicle brake systems effectively monitor brake overtemperature events, record meaningful health data related to such events, or otherwise seek to implement strategic actions in response to brake overtemperature events. One reason for this may stem from technical challenges encountered when attempting to directly measure the highly elevated internal brake temperatures occurring locally within a friction brake mechanism, as well as the transitory or dynamic nature of such thermal variances within the brake mechanism. An ongoing demand thus exists for work vehicle brake systems providing increasingly optimized brake energy management, prognostics, and protection functions through improved monitoring of brake overtemperature events and the performance of certain responsive actions when brake overtemperature events are detected or are otherwise tracked over periods of work vehicle operation.

In satisfaction of the above-described industrial demands, brake energy management systems suitable for deployment onboard work vehicles are disclosed. Through certain management, prognostic, and/or protective functions of the brake energy management system various benefits may be achieved including, but not limited to, encouraging proper machine operation to improve axle and braking system reliability; boosting customer uptime through increasingly intelligent, prognostic guidance of vehicle maintenance needs; and, when applicable, optimizing automatic braking functions by enabling control systems to more accurately assess and utilize appropriate brake apply levels. Similarly, the brake management processes described herein are usefully leveraged in the context of fully or semi-autonomous work vehicles to refine braking control schemes to further maximize work vehicle uptime, productivity, and durability.

During operation, embodiments of the brake energy management system repeatedly estimate internal temperatures within hydraulically-actuated, friction brake mechanisms onboard a work vehicle utilizing stored data and pertinent sensor inputs. Such sensor inputs may include, for example, data received from axle speed sensors configured to monitor the current rotational speeds of the work vehicle axles, as well as brake pressure sensors measuring hydraulic apply pressures supplied to the friction brake mechanisms. Additionally, embodiments of the present disclosure may consider other data inputs in carrying-out the presently-disclosed methods or algorithms including, for example, coolant (e.g., oil) exit temperatures downstream of the friction brake mechanisms, coolant flow rates (e.g., as directly measured or calculated based upon pump shaft speed and displacement values), and/or similar parameters impacting the dissipation properties of the friction brake mechanisms at a given juncture in time. Such data inputs may be provided to a processing subsystem, which consumes such data inputs in carrying-out specialized algorithms for estimating the internal brake temperatures of the friction brake mechanisms. Utilizing the brake temperature estimates, the processing subsystem monitors for brake overtemperature events by determining whether the current internal brake temperatures exceed one or more critical temperature thresholds stored in memory. When detecting a brake overtemperature event, the processing subsystem performs certain actions (herein, "brake overtemperature actions") to realize the management, prognostic, and/or protective functions of the brake energy management system.

The particular manner in which the processing subsystem of the brake energy management system estimates the internal brake temperatures of the work vehicle friction brake mechanisms will differ between embodiments. This notwithstanding, in one approach, the processing subsystem may consume, as inputs, the brake slip speed of one or more friction brake mechanisms (e.g., as measured utilizing data from the associated axle speed sensors), the hydraulic brake apply pressures supplied to the brake mechanisms, and any number of additional data inputs, such as parameters (e.g., flow rate and temperature) of a liquid coolant circulated through the friction brake mechanism. The processing subsystem may utilize these inputs to estimate an internal temperatures of the friction brake mechanisms as a function of the brake slip speed and the brake apply force, as calculated from the hydraulic brake pressure currently supplied to the brake mechanism. Specifically, in embodiments, the processing subsystem may estimate brake temperatures utilizing a preestablished predictive temperature model, which considers the magnitude of energy dissipated through brake mechanism as heat due to frictional forces during brake slippage, as discussed in more detail below.

Concurrently, the processing subsystem may also consider the energy withdrawn from the friction brake mechanism by active liquid cooling; e.g., as inferred from the current coolant (e.g., oil) flow rate and temperatures. In embodiments, the processing subsystem then compares the current internal brake temperature estimates to the critical temperature threshold values stored in memory; and, if the calculated brake temperature exceeds a particular critical temperature threshold, executes one or more brake overtemperature actions. Various different brake overtemperatures actions are envisioned and can be tailored to best suit a particular work vehicle platform, application, or usage. This stated, the brake overtemperature actions may generally include any combination of: (i) temporarily boosting the heat dissipation capabilities of the friction brake mechanisms (e.g., by increasing coolant flow rate through the brake mechanisms); (ii) recording health data into memory (or reporting such data to a network-connected device or operations center) describing the severity, duration, or other parameters of the brake overtemperature events; (iii) generating alerts or other visual notifications advising a work vehicle operator and/or remotely-located personnel (e.g., a supervisor located at data center) of brake overtemperature events or pursuant changes in brake health; and (iv) potentially modifying the functionality of an autobrake subsystem when active and deployed onboard the work vehicle in question.

Example embodiments of a work vehicle brake energy management system will now be discussed in greater detail in connection with FIGS. 1-7. While the example work vehicle brake energy management system is principally described below in the context of a particular type of work machine (namely, an articulated dump truck), embodiments of the brake energy management system can be utilized in conjunction with a wide range of work vehicles deployed in the construction, agriculture, forestry, and mining industries, as well as in other industrial contexts. Accordingly, the following description should be understood as merely providing a non-limiting example context in which embodiments of the present disclosure may be better understood.

Example Work Vehicle Brake Energy Management System

With initial reference to FIG. 1, an articulated dump truck 10 is equipped with a brake energy management system 12 in accordance with an example embodiment of the present disclosure. In addition to the brake energy management system 12, the dump truck 10 includes an articulated chassis 14, 16 having forward and rear frame sections 14, 16 joined via an articulation joint 18. The articulation joint 18 permits relative rotation or swiveling of the front and rear frame sections 14, 16 about an upright pivot axis as, for example, the articulated dump truck 10 turns; the pivot axis having a substantially vertical orientation (parallel to the Y-axis of a coordinate legend 20) when the dump truck 10 is on a level surface. An operator cabin 22 is supported by the front frame section 14 and contains various input or control devices, which collectively form an operator interface 24, enabling operator control of the articulated dump truck 10.

The operator interface 24 of the articulated dump truck 10 can include any combination of pedals, control levers or joysticks, physical buttons, switches, a steering wheel, and other such manual input devices commonly utilized in piloting work vehicles. The operator interface 24 may also include one or more display devices or in-cabin monitors for the generation of graphic user interfaces (GUI) including virtual instrument panels, which present operationally-relevant information to the work vehicle operator. Among other functions, the operator interface 24 enables an operator located in the cabin 22 to control the forward and rearward travel of the dump truck 10 through adjustments to the rotational speed and direction of a number of ground-engaging wheels 26. The ground-engaging wheels 26 are rotationally connected to a number of work vehicle axles (here, three work vehicle axles) such that the wheels 26 and the work vehicle axles corotate during travel of the articulated dump truck 10. Generally, rotation of the work vehicle axles and the wheels 26 is driven by an engine located within a forward engine compartment 28. Rotation of the work vehicle axles and the wheels 26 may be slowed or otherwise impeded, in a controlled manner, utilizing a hydraulic brake subsystem 30 further integrated into the dump truck 10. The hydraulic brake subsystem 30 contains a number of hydraulically-actuated, wet friction brake or devices mechanisms 54 and other hydraulic components 56. The friction brake mechanisms 54 are "wet" in the sense that oil or another cooling lubricant is circulated through the brake mechanisms 54 during dump truck operation, as discussed below in connection with FIGS. 3 and 4.

The articulated chassis 14, 16 of the articulated dump truck 10 supports a relatively large open receptacle or bin 32. The bin 32 is pivotally mounted to rear frame section 16 utilizing a number of pin joint assemblies 34, which restrict bin movement to rotation about a transverse pivot axis (generally parallel to the Z-axis of the coordinate legend 20). Two hydraulic lift cylinders 36 (only one of which can be seen) are positioned on opposing sides of the bin 32 and mechanically coupled between the bin 32 and the rear frame section 16. The hydraulic lift cylinders 36 each include a cylinder end 38 and an opposing rod end 40. The cylinder end 38 of each lift cylinder 36 is pivotally joined to the rear frame section 16 at a location proximate the articulation joint 18, while the opposing rod end 40 is pivotally joined to a sidewall of the bin 32. When the bin 32 resides in a level transport orientation, as shown, the hydraulic lift cylinders 36 each remain in retracted position. When an operator commands the bin 32 to rotate into a tipped position, the lift cylinders 36 extend and the bin 32 rotates about the transverse pivot axis set by the pin assemblies 34. Accordingly, the bin 32 tilts away from the operator cabin 22 to form a tipping angle relative to a generally horizontal plane, which is parallel to the X-Z plane of the coordinate legend 20 shown in the bottom left of FIG. 1. When the lift cylinders 36 fully extend, the bin 32 forms a maximum tipping angle of, for example, approximately 70 degrees (°) to empty any contents of the bin 32 into an area rearward of the articulated dump truck 10.

In additional to the operator interface 24 and the hydraulic brake subsystem 30, the brake energy management system 12 further includes a processing subsystem 42 and onboard sensors 44. The data connections between the processing subsystem 42 and the components or subsystems of the brake energy management system 12 are symbolically denoted by signal communication lines 46, which may represent wireless connections, wired connections, or a combination thereof. The onboard sensors 44 contained in the brake energy management system 12 can include any number of axle speed sensors 48, hydraulic brake pressure sensors 50, and other (e.g., temperature) sensors 52 useful in monitoring parameters considered by brake energy management system 12 in conducting the brake energy management processes. Examples of each sensor type 48, 50, 52 are discussed below. Certain ones of the onboard sensors 44 may also be included in or associated with the hydraulic brake subsystem 30, such as a hydraulic brake pressure sensor 50 configured to monitor a hydraulic input pressure or "brake apply pressure" supplied to the friction brake mechanisms 54 for actuation purposes. Additionally, one or more temperature sensors may be integrated into the hydraulic brake subsystem 30 for directly or indirectly gathering temperature data pertinent to the friction brake mechanisms 54. Such temperature data may indicate, for example, the upstream and/or downstream temperatures of oil or another liquid coolant actively circulated through the friction brake mechanisms 54. Various other hydraulic components 56 may further be contained in the hydraulic brake subsystem 30 as conventionally known, including any combination of pumps (e.g., a hydraulic pump 57), sumps, valves, filters, conduits, and the like.

As appearing herein, the term "processing subsystem" is utilized in a non-limiting, generalized sense to broadly refer to the processing components of the brake energy management system 12, which cooperate to carry-out any number of the processing and control functions described herein. The processing subsystem 42 can encompass or may be associated with any practical number of processors (central and graphical processing units), onboard control computers, controllers, navigational equipment pieces, computer-readable memories, power supplies, storage devices, interface cards, and other standardized components. Additionally, the processing subsystem 42 may include or cooperate with any number of firmware and software programs or computer-readable instructions designed to carry-out any pertinent process tasks, calculations, and control/display functions. The computer-readable instructions executed by the processing subsystem 42 may be stored within a non-volatile sector of a computer-readable memory 58 further included in the brake energy management system 12.

While generically illustrated as a single block in FIG. 1, the computer-readable memory 58 can encompass any number and type of storage media suitable for storing computer-readable code or instructions, as well as other data utilized to support brake energy management system operation. This may include the below-described critical temperature threshold data, as well as algorithms, functions, look-up tables, or other data structures utilized to convert brake energy levels into internal brake temperature estimates, such as local separator plate temperatures, as described below. Additionally, in instances in which the brake energy management system 12 carries-out certain prescribed actions (herein, "brake overtemperature actions") in response to the detection of brake overtemperature events or conditions, the computer-readable instructions stored in the memory 58 may specify the manner in which to perform such actions. Additional discussion of such brake energy management algorithms or processes is set-forth below in connection with FIGS. 5-7. First, however, example structural implementations of certain components of the dump truck 10 are described in conjunction with FIGS. 1-4 to provide a non-limiting context in which embodiments of the brake energy management system 12 may be better understood.

Figure 2:
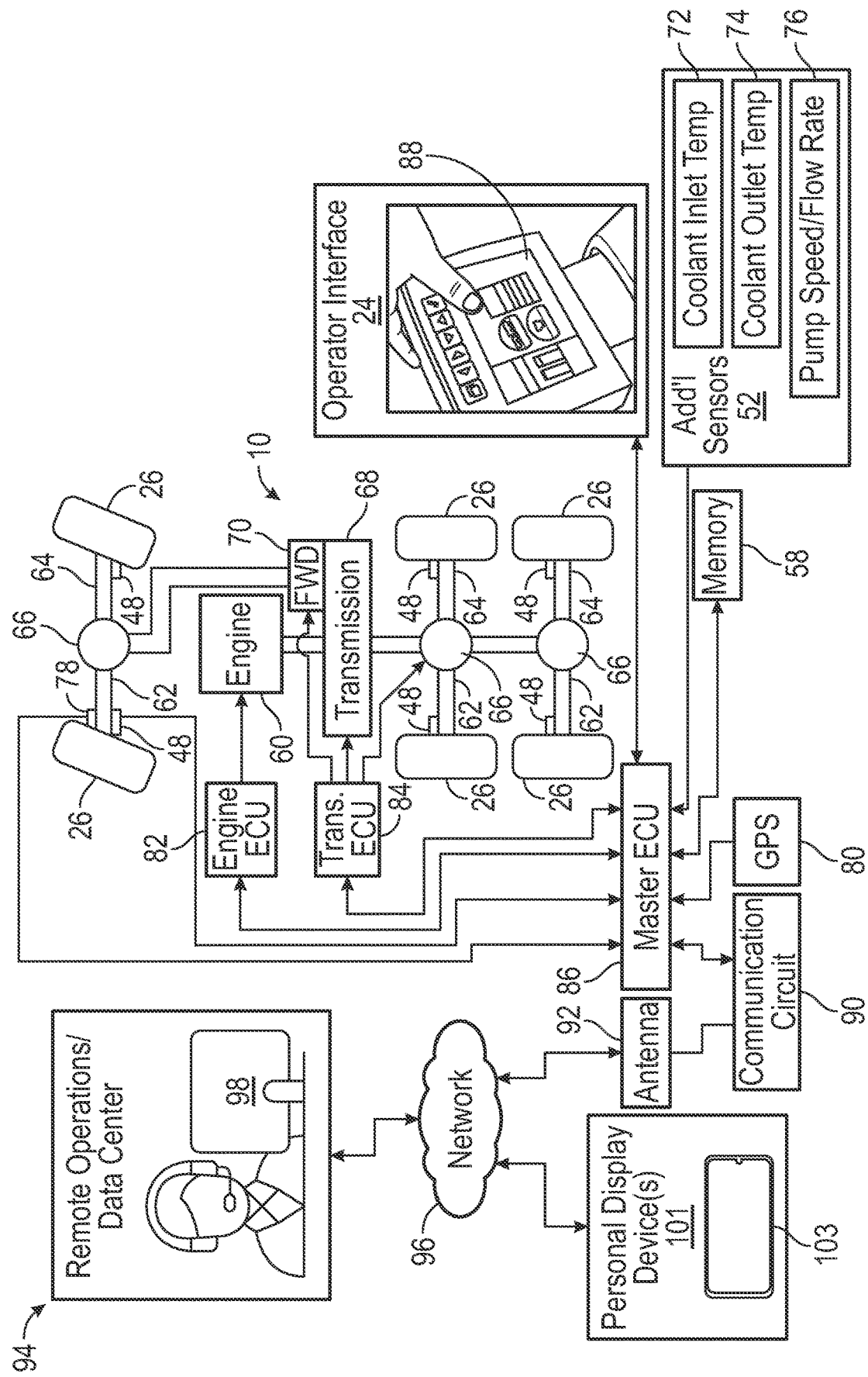
FIG. 2 is a schematic of certain components suitably included the brake energy management system of FIG. 1, as well as a remote operations center and one or more personal display devices in communication with the brake energy management system over a network, further illustrated in accordance with an example embodiment.

Referring now to FIG. 2 in conjunction with FIG. 1, an example implementation of the articulated dump truck 10 and the brake energy management system 12 is shown in greater detail. In this schematic diagram, the powertrain of the articulated dump truck 10 is illustrated as containing an engine 60, such as a heavy duty diesel engine, which drives rotation of a number of work vehicle axles 62, 64 through multiple differentials 66 and a transmission 68. The front axle 62, 64, specifically, is driven by the engine 60 through a front wheel drive (FWD) unit 70 included in, or otherwise mechanically connected to, an output shaft of the transmission 68. The work vehicle axles 62, 64 each contain a first half-shaft 62 and a second half-shaft 64, which are positioned in a coaxial relationship. The axle half-shafts 62, 64 are mechanically joined to the primary driveline of the articulated dump truck 10 through the differentials 66, which may assume the form of electronically or electro-hydraulically controlled locking differentials in embodiments.

When engaged or locked, the differentials 66 equalize the respective rotational rates of the corresponding axle half-shaft pairs 62, 64. Conversely, when disengaged or unlocked, the differentials 66 permit corresponding pairs of the half-shafts 62, 64, and thus corresponding sets of the wheels 26, to rotate independently at different speeds. Considering, then, that the axle half-shafts 62, 64 are capable of rotating at disparate speeds, the two axle speed sensors 48 may be separately positioned to monitor the speed of each half-shaft 62, 64 included in a particular work vehicle axle 62, 64. As schematically depicted in FIG. 2, an axle speed sensor 48 may be configured to monitor the individual rotational rate of each of the half-shafts 62, 64 of the articulated dump truck 10, providing a total of six axle speed sensors 48 in the present example. In other instances, the axle speed sensors 48 may be positioned to monitor a lesser number of the work vehicle axles 62, 64, noting that the number and structural features of the work vehicle axles will vary between embodiments and with different work vehicle platforms.

The brake energy management system 12 may further contain any number and type of additional onboard sensors 52, which are operably coupled to the processing subsystem 42. As schematically depicted in the lower right of FIG. 2, such additional sensors 52 can include any combination of coolant (e.g., oil) inlet temperature sensors 72, coolant outlet temperature sensors 74, and onboard sensors 76 for directly or indirectly determining coolant flow rate through the friction brake mechanisms 54; e.g., by monitoring the speed and/or displacement (if variable) of the hydraulic pump 57, which can be combined with known parameters (pump displacement) to determine pump output. Such sensors may be operably coupled to the processing subsystem 42 through a vehicular bus or another data connection onboard the articulated dump truck 10. Similarly, the articulated dump truck 10 is further equipped with various sensors of the type commonly deployed onboard work vehicles, which monitor parameters not directly applicable to the operation of the brake energy management system 12. While not described in detail herein for concision, such additional sensors can include a wheel angle sensor 78 for measuring the turning angle of the articulated dump truck 10 and a global positioning system (GPS) unit 80 for tracking geographical positioning and motion state (e.g., speed and heading vectors) of the articulated dump truck 10.

As briefly described above, the processing subsystem 42 of the brake energy management system 12 can encompass any number of individual control units or controllers, which are operably interconnected and capable of performing the functions described herein. Further illustrating this point, FIG. 2 schematically depicts the articulated dump truck 10 as containing a number of electronic control units (ECUs), some or all of which may help form the processing subsystem 42 shown in FIG. 1. Here, the illustrated ECUs include an engine ECU 82, a transmission ECU 84, and a master ECU 86. The engine ECU 82 and the transmission ECU 84 generally control operation of the work vehicle engine 60 and the work vehicle transmission 68, respectively. The master ECU 86 is coupled to the engine ECU 82 and the transmission ECU 84 for bidirectional signal communication to synchronize, or to otherwise control, the operation of the ECUs 82, 84. Additionally, as indicated in FIG. 2, the master ECU 86 may receive data from, and transmit data to, various other components onboard the articulated dump truck 10 including, for example, the GPS unit 80, the computer-readable memory 58, the onboard sensors 52, at least one in-cabin monitor or display device 88 included in the dump truck operator interface 24, and a wireless network interface 90, 92.

When located onboard the dump truck 10, the wireless network interface 90, 92 can include a communications circuit or module 90 and an antenna 92. As schematically illustrated in FIG. 1, the communications network 96 broadly encompasses any number and type of networks, systems, or architectures for transmitting data between the articulated dump truck 10 and a remote operations data center 94. Accordingly, the communications network 96 can include one or more open content delivery networks, Virtual Private Networks (VPNs), the Internet, cellular networks, and other communications networks implemented in accordance with transmission control protocol/Internet protocol (TCP/IP) architectures or other conventional protocols. In various embodiments, the network 96 may further encompass one or more Local Area Networks (LANs), wide area networks (WANs), controller area networks (CANs), and similar wireless networks. In such instances, the brake energy management system 12 may selectively transmit data to the remote operations data center 94 to, for example, allow remote diagnostic or prognostic monitoring of the health and operational conditions of the friction brake mechanisms 54 onboard the articulated dump truck 10.

Additionally or alternatively, visual notifications of brake overtemperature events, or other visual indicators of brake health and/or service recommendations informed by the detection of brake overtemperature events, can be generated on a display device 98 located at the remote operations data center 94, as discussed below in connection with FIG. 6. Similarly, at least one personal display device 101, such as a laptop, tablet, or smartphone 103, may also be capable of communication with the data center 94 and/or the brake energy management system 12 over the communications network 96 in embodiments. In this case, the below-described visual notifications can further be generated on the personal display device 101, which may be carried by a personnel member (e.g., an operator of the articulated dump truck 10) and which may execute a software application loaded onto the operating system of the display device 101, in addition to the notifications generated on the in-cabin display device 88 and/or the data center display terminal 98. Finally, in at least some implementations, certain processing tasks may be performed offboard the articulated dump truck 10 utilizing, for example, one or more servers associated with the remote operations data center 94 or otherwise in communication with the brake energy management system 12 over the network 96; while, in other instances, the below-described process steps may be wholly performed on a local basis by the processing subsystem 42.

Embodiments of the brake energy management system 12 advantageously leverage existing work vehicle sensors to facilitate adoption of the brake energy management system 12 with minimal cost and alteration to existing work vehicle platforms. In this regard, axle speeds sensors suitable for usage as the axle speed sensors 48 are increasingly deployed onboard production work vehicles. Such axle speed sensors may utilize, for example, optical or magnetic sensing techniques to detect the proximity and passage of the ridges or spines on a splined shaft portion provided on each of the half-shafts 62, 64 to monitor axle rotational rates. Examples of sensors suitable for usage as the axle speed sensors 48 may be found in the following document, which is incorporated by reference: U.S. patent application Ser. No. 16/581,963, entitled "WHEEL SPEED SENSING SYSTEM," filed with the United States Patent and Trademark Office (USPTO) on Sep. 25, 2019, and published Mar. 25, 2021, as U.S. Pub. No. 2021/0086557 A1. Similarly, embodiments of the present disclosure can incorporate various known sensors 50 for measuring the below-described hydraulic brake apply pressures, temperature sensors for measuring oil temperatures, and sensors for monitoring hydraulic pump speed and/or displacement to calculate coolant flow rate through the friction brake mechanisms 54 (when applicable). In other instances, such sensors may be omitted from embodiments of the present disclosure and/or such data inputs may be inferred from other data sources.

Figure 3:
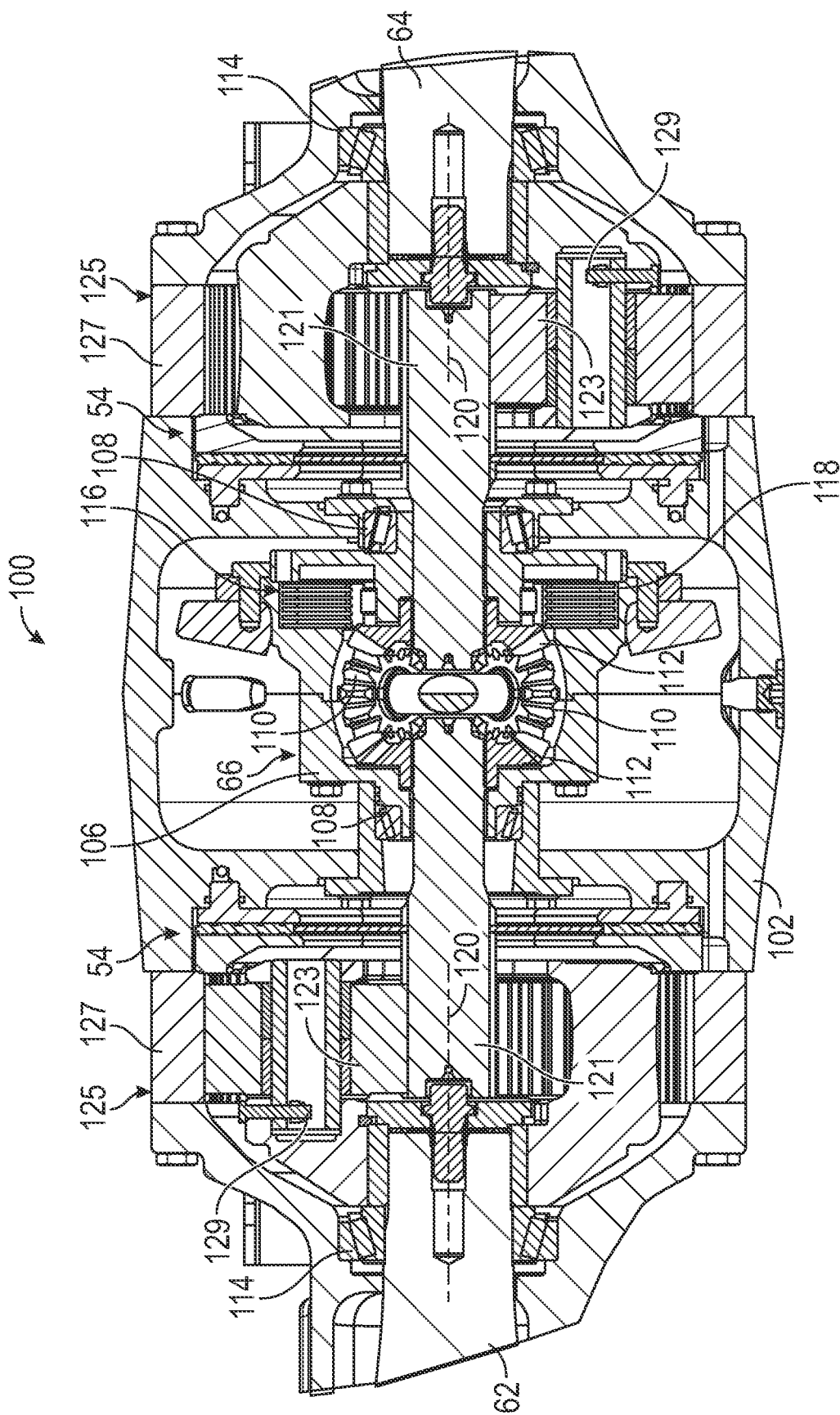
FIG. 3 is a cross-sectional view of an assembly including a locking differential and two hydraulically-actuated friction brake mechanisms, multiple instances of which may be contained in the brake energy management system shown in FIGS. 1 and 2.

Turning to FIG. 3, a simplified cross-sectional view is presented of an axle assembly 100 including a locking differential 66, two friction brake mechanisms 54, and a casing or assembly housing 102. The locking differential 66 is centrally located between the friction brake mechanisms 54 and includes, among other features, a differential gearing arrangement 110, 112 and a differential clutch mechanism 116. Various differential gearing arrangements are known and the particular gearing system utilized as the gearing arrangement 110, 112 may differ between embodiments. Further, certain gears included in the example gearing arrangement 110, 112 may not be visible in the cross-section of FIG. 3. This stated, multiple spider or pinion gears 110 and two side gears 112, which mesh with the pinion gears 110, can be seen as in the example gearing arrangement 110, 112. The differential side gears 112 are splined to or otherwise rotationally affixed to sun shafts 121, which are, in turn, each mechanically coupled to a different axle half-shaft 62, 64; here, through two planetary gear sets 125, as discussed below. Comparatively, the pinion gears 110 are supported by a rotatable pinion carrier 106 and are rotatable relative thereto about a common axis. While only two pinion gears 110 can be seen in the illustrated cross-section, the differential gearing arrangement 110, 112 may contain three or more pinion gears 110 for increased torque capacity in embodiments. The pinion carrier 106 is rotatable about a common rotational axis 120 along with the sun shafts 121 and the axle half-shafts 62, 64. A number of rollers bearings 108 are provided at appropriate interfaces to support rotation of the pinion carrier 106. Similarly, the half-shafts 62, 64 are supported by roller bearings 114, which facilitate low resistance rotation of the half-shafts 62, 64 relative to the rotationally-grounded assembly housing 100.

The differential clutch mechanism 116 within the axle assembly 100 is normally maintained in a disengaged or unlocked state, perhaps by a non-illustrated retractor spring. When the differential clutch mechanism 116 is unlocked, the pinion carrier 106 is permitted to freely rotate relative to the housing assembly 102 about the primary axis 121. This enables the axle half-shafts 62, 64 to rotate independently at different speeds. When the differential clutch mechanism 116 is desirably locked, an elevated hydraulic pressure is applied to the clutch mechanism 116 to extend a hydraulic piston and apply a relatively high clamp force across a multidisc clutch pack 118 within the clutch mechanism 116. When locked in this manner, the locking differential 66 is forced to rotate as a unit about the primary rotational axis 120. This equalizes the rotational speed of the two axle half-shafts 62, 64 until the differential clutch mechanism 116 is again unlocked.

Figure 4:
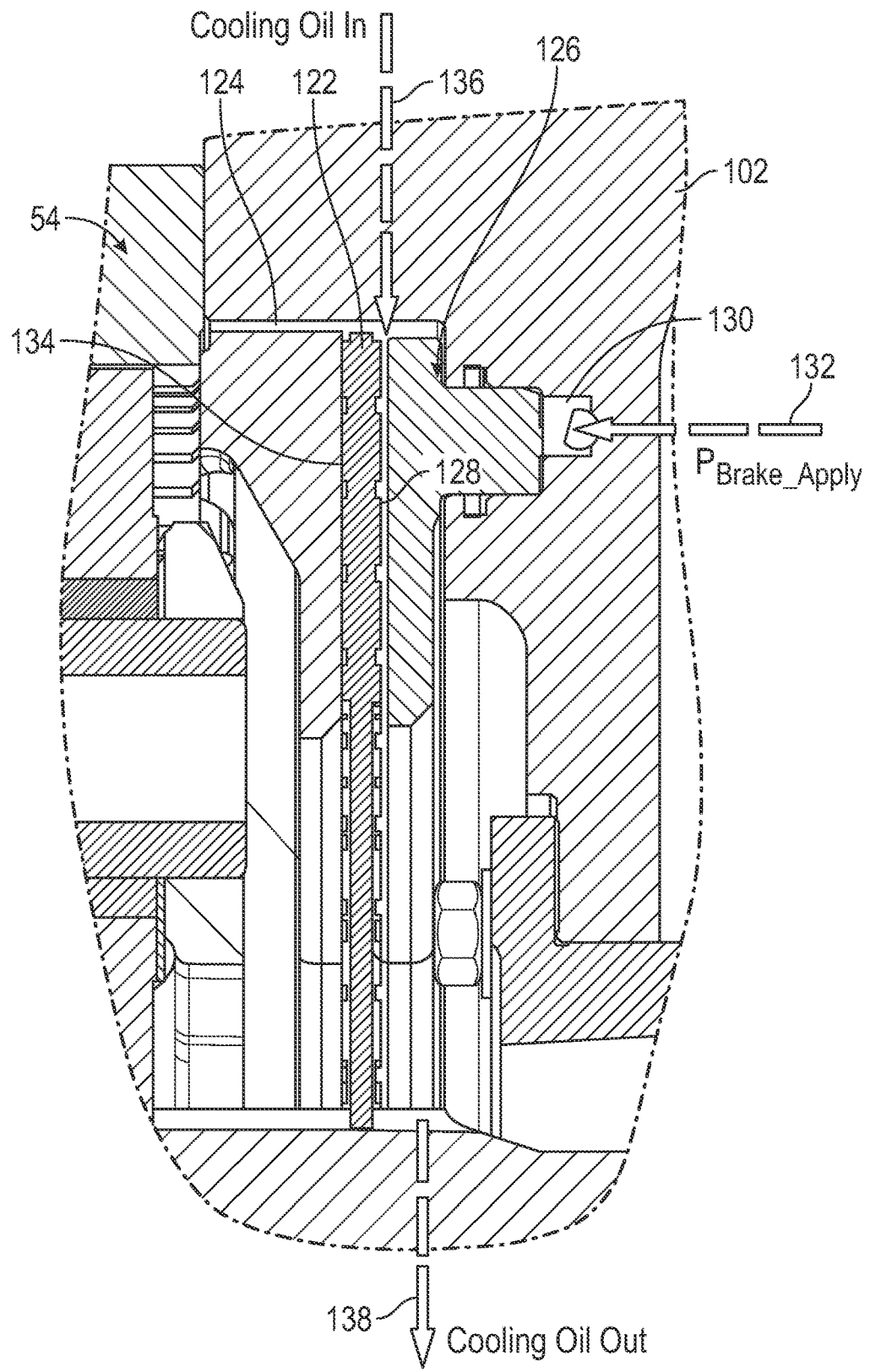
FIG. 4 is a cross-sectional view of a portion of the assembly shown in FIG. 3 illustrating one of the friction brake mechanisms in greater detail.

Referring now to FIG. 4 in combination with FIG. 3, the example friction brake mechanisms 54 contained in the axle assembly 100 are described in greater detail. While a limited portion of one of the friction brake mechanisms 54 is shown in FIG. 4, the following description is equally applicable to the other friction brake mechanism 54 of the axle assembly 100 and, more generally, the other friction brake mechanisms 54 onboard the example articulated dump truck 10 (FIGS. 1-2). Here, the friction brake mechanisms 54 are imparted with single friction plate designs and each include a brake rotor disc 122, which is mechanically coupled to one of the half-shaft 62, 64 in a corotational relationship. More specifically, in the illustrated example, each brake rotor disc 122 is splined to or otherwise mounted to one of the sun shafts 121, which support sun gears 123 further included in the outboard planetary gearing arrangements 125 (FIG. 3). The planetary gearing arrangements 125 also each include a ring gear 127 and carrier assembly 129 including a number of planet gears, which mesh with the corresponding sun gear 123 and ring gear 127 to provide a desired planetary gear arrangement in the well-known manner. In addition to the brake rotor disc 122, the friction brake mechanisms 54 each also include a hydraulically-actuated, annular piston 126 and a backing plate 134 disposed on opposing sides of the rotor disc 122. The annular piston 126 is slidably mounted within the housing assembly 102 at a location adjacent the rotor disc 122. In one common design, the annular piston 126 is biased toward a retracted position by, for example, a non-illustrated retractor spring; however, this may not be the case in other embodiments.

The following describes the actuation of the friction brake mechanisms 54 in the illustrated example, again noting the construction and operation of the brake mechanisms can differ in various respects in alternative embodiments. When an elevated brake apply pressure (identified as "$P_{BRAKE\_APPLY}$" and represented by arrow 132 in FIG. 4) is supplied to a control chamber 130 within the housing assembly 102, the hydraulic fluid within the control chamber 130 acting on the exposed area of the annular piston 126 rises to a level sufficient to overcome the spring bias force (when applicable). This causes the annular piston 126 to slide toward and press against the rotor disc 122 (to the left in FIG. 4). A clamping force is exerted across the brake rotor disc 122 as the friction-engagement face 128 of the annular piston 126 presses the brake rotor disc 122 against the backing plate 134 (or another static structure) contained in the assembly housing 102. The resulting clamping force impedes rotation of the brake rotor disc 122, and therefore rotation of the axle half-shaft to which the rotor disc 122 is coupled in a rotationally-fixed relationship, to provide the desired braking function and slow rotation of the work vehicle axle when the work vehicle (e.g., the articulated dump truck 10, FIGS. 1-2) is in motion. In other instances, the friction brake mechanism 54 can possess a different construction or design, providing the brake mechanism 54 is controllable to impede rotation of a work vehicle axle through selectively frictional engagement of rotating and non-rotating components within the brake mechanism.

Relatively high frictional forces may develop across the friction interface or brake clutch components of the brake mechanism 54, when applied, in the presence of slippage between the brake rotor disc 122 and the non-rotating components of the brake mechanism 54. Such frictional forces are converted to waste heat, which can rapidly accumulate within the friction brake mechanism 54 and lead to brake overtemperature conditions. To reduce the accumulation of heat, the friction brake mechanisms 54 are actively cooled utilizing a coolant supplied via inlet and outlet passages, which receive and discharge coolant inflow and outflow, respectively, as indicated by arrows 136, 138 in FIG. 4. Such an active cooling scheme allows the circulation of a liquid coolant or cooling lubricant, such as oil, through the brake mechanism cavity 124 in which the brake rotor disc 122 is housed. As the coolant flows through the cavity 124, the coolant contacts the friction engagement surfaces of the brake mechanism 54, including the brake rotor disc 122, to conductively remove excess heat therefrom and provide the desired cooling effect.

The above-described active liquid cooling of the friction brake mechanism 54 is typically sufficient to maintain the brake clutch components within acceptable temperature ranges and prolong the operational lifespan of the brake components under most circumstances. During brake overtemperature events, however, highly elevated local temperatures can develop within a given friction brake mechanism 54 due to the rapid generation of large quantities of heat, which outpace the heat removal capacity of the liquid cooling system. At certain elevated temperatures, undesired breakdown or degradation of the coolant (e.g., oil) can occur resulting in the local deposit of contaminants (e.g., carbon or coke) over the friction material provided along faces of brake clutch components, which contact when the friction brake mechanisms 54 are applied. This, in turn, may reduce the effectiveness of the friction brake mechanisms 54 in slowing the speed of the axle half-shafts and, more generally, the associated work vehicle axle 62, 64 when so desired.

To minimize brake overtemperature events and prolong the operational lifespan of the friction brake components, the brake energy management system 12 carries-out an algorithm or computer-implemented process (herein, a "brake energy management method") during operation of the articulated dump truck 10. One such brake energy management method 140 is set-forth in FIG. 5 and depicted in accordance with an example embodiment of the present disclosure. The example brake energy management method 140 includes several process steps 144, 146, 148, 150, 152, 154 each of which is described, in turn, below. Depending upon the particular manner in which the brake energy management method 140 is implemented, each step generically illustrated in FIG. 5 may entail a single process or multiple sub-processes. Further, the steps illustrated in FIG. 5 and described below are provided by way of non-limiting example only. In alternative embodiments of the brake energy management method 140, additional process steps may be performed, certain steps may be omitted, and/or the illustrated process steps may be performed in alternative sequences.

The example brake energy management method 140 commences at step 142 in response to the occurrence of a predetermined trigger event. Generally, such a trigger event may be the usage of the friction brake mechanisms 54 (FIGS. 1-4) to slow rotation of the work vehicle axles 62, 64 during forward or rearward travel of the articulated dump truck 10. Alternatively, the trigger event may be more selective such that the brake energy management method 140 is conducted exclusively when the articulated dump truck 10 is traveling above a particular speed threshold at which high energy braking events are more likely to occur. In still other instances, a different trigger event may be utilized. Regardless of the particular trigger event or events employed, after commencing the brake energy management method 140, the processing subsystem 42 progresses to step 144 and collects input data from one or more data sources onboard the work vehicle. In effect, during step 144, the processing subsystem 42 gathers the information utilized in performing the remainder of the brake energy management method 140.

The particular data parameters collected by the processing subsystem 42 during step 144 will vary among embodiments of the present disclosure. This stated, the processing subsystem 42 may gather data from the axle speed sensors 48 (FIG. 2) monitoring the respective rotational speeds of the work vehicle axles 62, 64, as well as data indicative of the current brake apply force; e.g., as reported by at least one brake pressure sensor (e.g., the sensor 50, FIG. 1) indicating the brake apply pressure or pressures supplied to the friction brake mechanisms 54. In certain cases, the processing subsystem 42 may also collect data indicative of the current heat dissipation capabilities of the active cooling system utilized to circulate coolant through the brake mechanisms 54. For example, in this latter regard, such data may describe or indicate current (e.g., upstream and/or downstream) coolant temperatures and the coolant flow rate through the friction brake mechanism or assemblies 54; e.g., as measured utilizing the sensors 52 (FIGS. 1-2) in the manner previously described.

Next, at step 148 of the method 140, the processing subsystem 42 estimates the current internal temperature of the friction brake mechanisms 54. In one approach, the processing subsystem 42 utilizes the data reported by the axle speed sensors 48 to monitor the brake slip speeds of the friction brake mechanisms 54 when applied to slow rotation of the work vehicle axles 62, 64. The processing subsystem 42 may assume equal conditions for all, or a subset of, the friction brake mechanisms 54 utilized to slow a particular work vehicle axle 62, 64 in at least some embodiments. In other implementations, the processing subsystem 42 may separately consider the friction brake mechanisms 54 positioned about a given axle 62, 64 given that the half-shafts 62, 64 are capable of rotating at disparate rates when the corresponding differential 66 is unlocked. The processing subsystem 42 then estimates the current internal temperatures of the friction brake mechanisms 54 based, at least in part, on the brake slip speed and the brake apply pressure reported by the brake pressure sensors 50. Also, as previously noted, the processing subsystem 42 may also consider other parameters impacting the active liquid cooling of the friction brake mechanisms 54, when applicable. This may include parameters pertaining the coolant (e.g., oil) circulated through the friction brake mechanisms 54, such as the coolant inlet temperature, coolant outlet or exit temperature, and coolant flow rate. With respect to the coolant flow rate, in particular, this parameter may be sensed directly utilizing a flow rate sensor; or, instead, calculated based upon hydraulic pump speed (e.g., the speed of the hydraulic pump 57 shown in FIG. 1) and known pump displacement characteristics (or monitored pump displacement in embodiments in which the pump 57 assumes the form of a variable displacement pump).

Continuing the description above, in embodiments, the processing subsystem 42 estimates the internal brake temperatures in terms of the energy content of the friction brake mechanisms 54. To this end, the processing subsystem 42 may initially determine the brake apply exerted across the friction interfaces or clutch components of the friction brake mechanisms 54 as a function of (i) the current brake apply pressure ($P_{BRAKE\_APPLY}$) supplied to the brake mechanisms 54, and (ii) the effective area of the annular piston 126 in each brake mechanism 54. The effective area of the annular piston 126 in each brake mechanism 54 is a known parameter, while the brake apply pressure is a variable parameter determined from current sensor input. A suitable formula or equation can thus be readily established, stored in the computer-readable memory 58, and utilized by the processing subsystem 42 to determine the estimated brake energy input based upon the brake apply pressure reported by sensors 50 (FIG. 1). Following this, the processing subsystem 42 may next estimate the energy dissipation through the brake mechanisms 54 due to frictional conversion to heat given the degree of slippage, as measured by the axle speed sensors 44. In this manner, the heat input into the brake mechanisms 54 can be determined and tracked. Heat output of the brake mechanisms 54 may further be considered, in embodiments, by the processing subsystem 42. In particular, the processing subsystem 42 may consider the amount of heat removed from the brake mechanisms 54 by the liquid cooling system, noting that heat removal by convection to the ambient air will often be negligible (although this may also be considered by the processing subsystem 42 in certain instances). In at least some cases, the heat dissipation capabilities of the active cooling system may be assigned a fixed value defining a quantity of heat carried away due to transportation by the liquid coolant circulated through the friction brake mechanisms 54. In other instances, the current coolant flow rate, coolant inlet temperature, and/or coolant outlet temperature may be considered by the processing subsystem 42 to more accurately estimate heat removal by active cooling of the brake mechanisms 54. The resulting net thermal energy within the brake mechanism system, as tracked over time, can then be utilized to estimate the current internal temperatures of the brake mechanisms 54.

In the above-described manner, the processing subsystem 42 of the brake energy management system 12 can readily estimate or infer the internal brake temperatures of the friction brake mechanisms 54 with a relatively high degree of accuracy utilizing onboard sensor inputs and stored data. In certain embodiments, the processing subsystem 42 may estimate the internal brake temperatures of the friction brake mechanisms 54 utilizing a pre-established predictive temperature model, which factors in the calculated brake energy and one or all of the above-noted coolant parameters; e.g., coolant flow rate, coolant inlet temperature, and/or coolant outlet temperature. In such embodiments, the predictive temperature model can be stored within the memory 58 as any suitable data structure (e.g., a multi-dimensional lookup table or as a mathematical function) and may be developed utilizing empirical data gathered through control testing utilizing thermo-coupled brake clutch components (e.g., the separator plate or plates) to create a model unique to the particular work vehicle axle and friction brake mechanisms under consideration. Stated differently, a predictive temperature model may be constructed utilizing empirical testing carried-out with a test rig or bench in which the internal temperature of the model brake mechanism may be mapped for a range of brake slip speeds, brake apply pressures, and possibly coolant flow conditions.

As the quantities of heat generated under high energy brake slippage conditions outpaces the heat removal capabilities of the active liquid cooling system, heat accumulates within the friction brake mechanisms 54. The internal brake temperatures can consequently rapidly rise under such conditions and can potentially surpass critical temperature thresholds resulting in brake overtemperature events. To sense or detect such brake overtemperature events and react accordingly, the processing subsystem 32 next advances to step 148 of the brake energy management method 140. Accordingly, after estimating the internal brake temperature or temperatures of the friction brake mechanisms 54, the processing subsystem 42 determines whether the internal brake temperature exceeds one or more critical temperature thresholds stored in the computer-readable memory 58 (step 148). If determining that the calculated internal brake temperature exceeds at least one of the critical temperature thresholds stored in the memory 58, the processing subsystem 42 progresses to step 150 of the brake energy management method 140. Otherwise, the processing subsystem 42 continues to step 152 of the method 140 and determines whether the current iteration of the brake energy management method 140 should terminate; e.g., due to release of the brake pedal by an operator or removal of another trigger condition considered during step 142 of the method 140. If determining that the brake energy management method 140 should terminate at step 152, the processing subsystem 42 progresses to step 154 of the method 140, and the method 140 terminates accordingly. If instead determining that the brake energy management method 140 should continue, the processing subsystem 42 returns to step 144 and the above-described process steps repeat or loop.

When determining that the newly-calculated internal brake temperature exceeds a critical temperature threshold stored in the computer-readable memory 58, the processing subsystem 42 of the brake energy management system 12 advances to step 150 of the brake energy management method 140 and performs one or more brake overtemperature actions. By way of non-limiting illustration, four examples of such brake overtemperature actions 155, 156, 158, 160 are set-forth in FIG. 5 and described below. Any combination of the brake overtemperature actions 155, 156, 158, 160 may be performed in embodiments; and, in instances in which the processing subsystem 42 monitors for the exceedance of multiple critical temperature thresholds, certain brake temperature actions 155, 156, 158, 160 may only be performed in response to exceedance of higher temperature thresholds by the estimated internal temperatures within the friction brake mechanisms 54.

Figure 5:
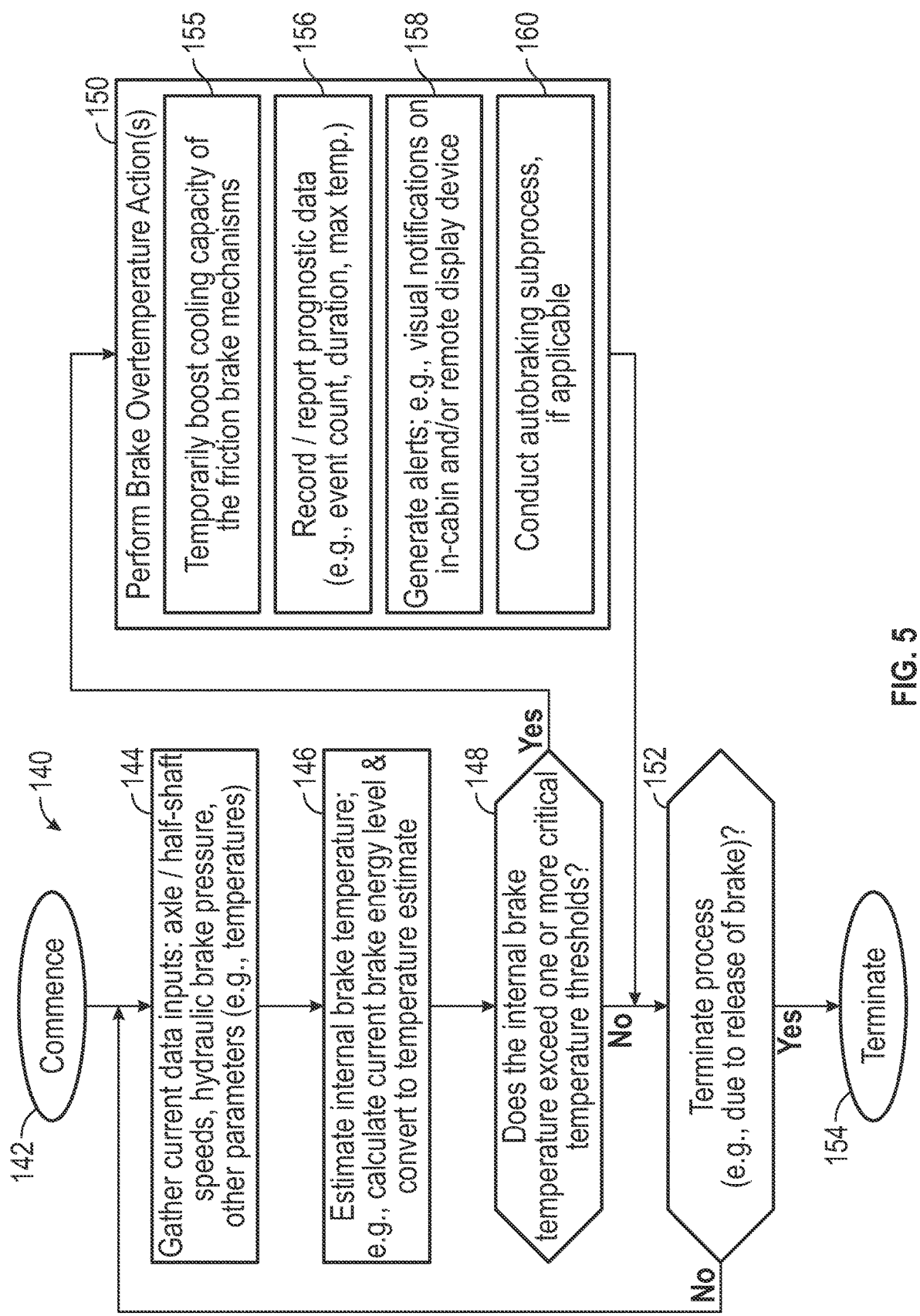
FIG. 5 is a flowchart of an example brake energy management process suitably carried-out by the processing subsystem of the example brake energy management system (FIGS. 1-3) to estimate internal temperatures within the friction brake mechanisms and perform certain responsive actions when detecting brake overtemperature conditions.

Initially addressing the first overtemperature action 155 shown in FIG. 5, the processing subsystem 42 can temporarily boost the cooling capacity (heat dissipation capabilities) of the liquid cooling system as it pertains to the friction brake mechanisms 54. In many instances, the processing subsystem 42 may perform one or more actions to temporarily increase the output of the hydraulic pump 57 and, therefore, increase the rate of coolant flow through the friction brake mechanisms 54; e.g., by increasing the speed of the hydraulic pump 57 when assuming the form of a fixed displacement pump and/or by controlling the hydraulic pump 57 (e.g., through angular adjustments to a swash plate) when assuming the form of an axial piston pump or another variable displacement pump. By increasing the rate of coolant flow (e.g., cooling oil flow) through the friction brake mechanisms 54, a greater quantity of heat may be carried-away from the friction brake mechanisms 54 over a given span of time to boost the active cooling of the brake mechanism or mechanisms under consideration. Additionally or alternatively, if valving or other components are available to reroute a greater volume of coolant flow or coolant flow having a lower inlet temperature through the friction brake mechanisms 54, the processing subsystem 42 may control the appropriate components (e.g., valve actuators) to accomplish this effect; e.g., by temporarily altering or rerouting coolant flow to provide a lower coolant inlet temperature to the friction brake mechanisms 54. The processing subsystem 42 may then maintain the active cooling system in such a high cooling capacity mode until the estimated internal temperatures within the friction brake mechanisms 54 again decrease to acceptable limits.

In addition to or in lieu of boosting the cooling capacity of the friction brake mechanisms 54 (brake overtemperature action 155), the processing subsystem 42 can record data into the memory 58 for subsequent diagnostic or prognostic purposes during a brake overtemperature event (brake overtemperature action 156). Additionally or alternatively, the processing subsystem 42 may report such data to the remote operations data center 94 via wireless transmission over the network 96 of the pertinent data describing the brake overtemperature event, whether such data is transmitted in real-time during the brake overtemperature event or at a juncture subsequent thereto. In either case, various parameters pertaining to detected brake overtemperature events and useful in evaluating the health of the friction brake mechanisms 54 can be recorded, shared with the remote operations data center 94, or both. A non-exhaustive list of such parameters includes time-correlated temperature estimates during the brake overtemperature events, data indicative of the severity (e.g., the durations and/or peak temperatures) of brake overtemperature events, and information identifying the friction brake mechanisms 54 to which the brake overtemperature data applies if the brake mechanisms 54 are distinguished from one another in this respect. Additionally, embodiments of the processing subsystem 42 may maintain a running tally or count of the number of overtemperature events occurring for the friction brake mechanisms 54 since last servicing and/or may record other information (e.g., an operator identification pin) useful in assessing the performance of an operator in piloting the work vehicle. Such data may be subsequently retrieved from the computer-readable memory 58 or analyzed at the network-connected data center 94 for prognostic or diagnostic purposes; e.g., to accelerate or otherwise adjust the scheduled servicing of the friction brake mechanisms 54 and other components of the hydraulic brake subsystem 30 (FIG. 1), as appropriate.

Addressing the third brake overtemperature action 158 set-forth in the example method 140 (FIG. 5), the processing subsystem 42 of the brake energy management system 12 may further provide visual feedback to a local operator or to a remote entity (e.g., a dealer or the service center 94) notifying certain parties (e.g., in real-time or near real-time) of brake overtemperature events or degradations in brake health resulting from the occurrence of such events. For example, in embodiments, graded alerts or visual notification may be generated on an in-cabin display device (e.g., the in-cabin display device 88 shown in FIG. 2) and/or via a remotely-locate display device (e.g., the data center display device 98 or the personal display device 101) indicative of the occurrence and severity of detected brake overtemperature events. In such instances, the processing subsystem 42 may determine whether the estimated internal brake temperature of the friction brake mechanisms 54 exceeds: (i) a first critical temperature threshold stored in the computer-readable memory 58 indicative of brake overtemperature events of low or moderate severity; and (ii) a second critical temperature threshold, which is further stored in the memory 58, exceeds the first critical temperature threshold, and is indicative of higher severity brake overtemperature events.

If, during step 150, the processing subsystem 52 determines that the current estimated internal brake temperature exceeds the first critical temperature threshold, while remaining below the second critical temperature threshold, the processing subsystem 42 may generate a low level alert on one or more display devices associated with the work vehicle in question; e.g., any combination of the display devices 88, 98, and 101 associated with the articulated dump truck 10 shown in FIGS. 1-2. If, instead, the estimated internal brake temperature exceeds both the first and second critical temperature thresholds, the processing subsystem 42 may generate or cause the generation of a more urgent, high level alert on the appropriate display devices; e.g., the in-cabin display device 88, the remotely-located display device 98, and/or the personal display device 101 shown in FIG. 2. Additionally or alternatively, a text annunciation, a symbol, or another visual cue may be produced on the appropriate display device(s) alerting the work machine operator, a supervisor, or other parties that the braking capacity of the hydraulic brake system 30 may be diminished and recommending prompt servicing of the vehicle brake system.

Figure 6:
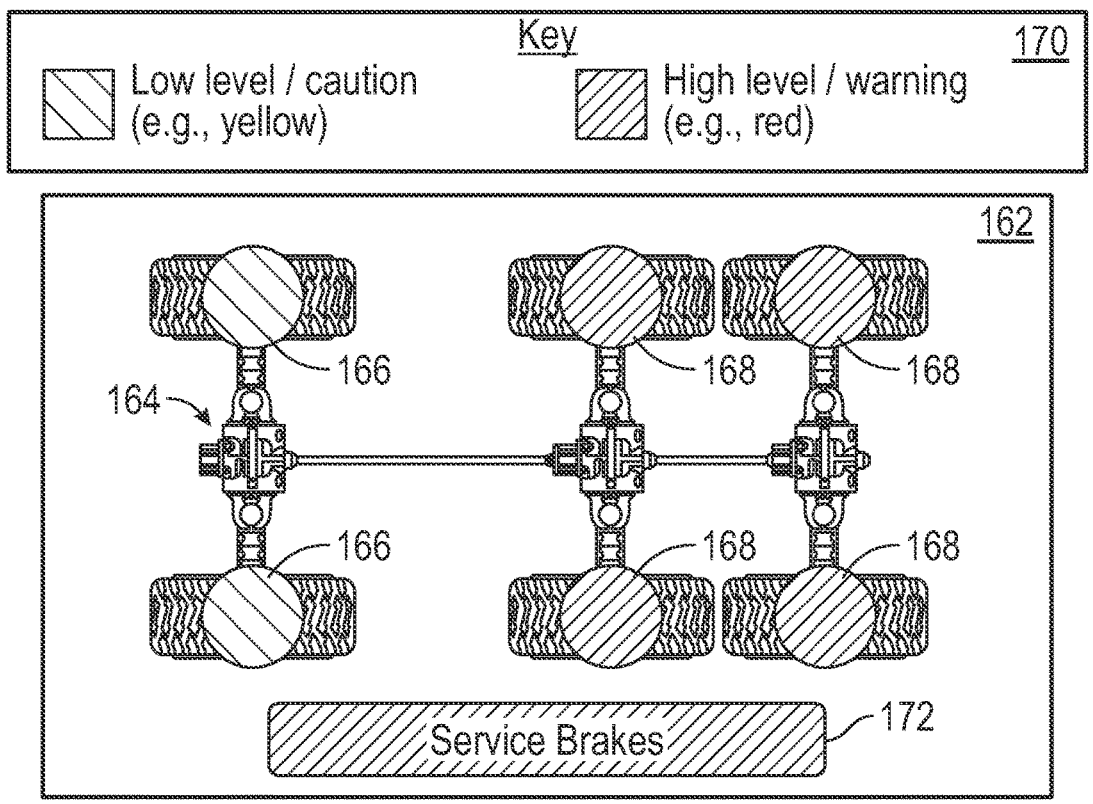
FIG. 6 illustrates an example display including symbology indicative of brake overtemperature events, which may be generated on a display device contained in or otherwise associated with the brake energy management system in embodiments.

An example of a graphic display 162 including notifications of overtemperature events is shown in FIG. 6. As can be seen, any number of symbols or icons 166, 168 may be generated on the display 162 and overlaid onto appropriate locations of a powertrain graphic 164 to denote the severity of detected brake overtemperature events, as well as to visually identify the particular friction brake mechanisms or assemblies to which the overtemperature events pertain. For example, as indicated by a key 170, the icons 166, 168 may be color coded or otherwise visually distinguished to denote the severity of a detected brake overtemperature event (or variations in brake health due to the brake overtemperature event). Specifically, in this example, the icons 166 may be generated in a first coded color (e.g., yellow) to indicate a mild or less severe brake overtemperature temperature event (or a lesser degree of potential brake degradation due to the detected brake overtemperature event, possibly considered in conjunction with historical data of other recent brake overtemperature events). Comparatively, icons 168 may be generated in a second, increasingly striking coded color (e.g., red) to denote the occurrence of a severe brake overtemperature event (or a larger degree of brake degradation due to the detected brake overtemperature event, again possibly combined with historical data of other recent brake overtemperature events). In other instances, icons denoting different levels of brake overtemperature events may be visually distinguished in another manner; e.g., through variations in icon shape, icon size, or via the application of animation effects, such as a flashing effect. In the case of severe overtemperature events, audible or haptic alerts can be generated in conjunction with the visual notifications produced on the appropriate displays, such as the in-cabin display device 88. Further, a text annunciation or pop-up 172 may be generated advising the viewer that servicing of the brakes may be warranted in response to severe brake overtemperature events. In other implementations, the example display 162 can differ in appearance or symbology, and various additional gradients or categories of brake overtemperature alerts may be generated.

Figure 7:
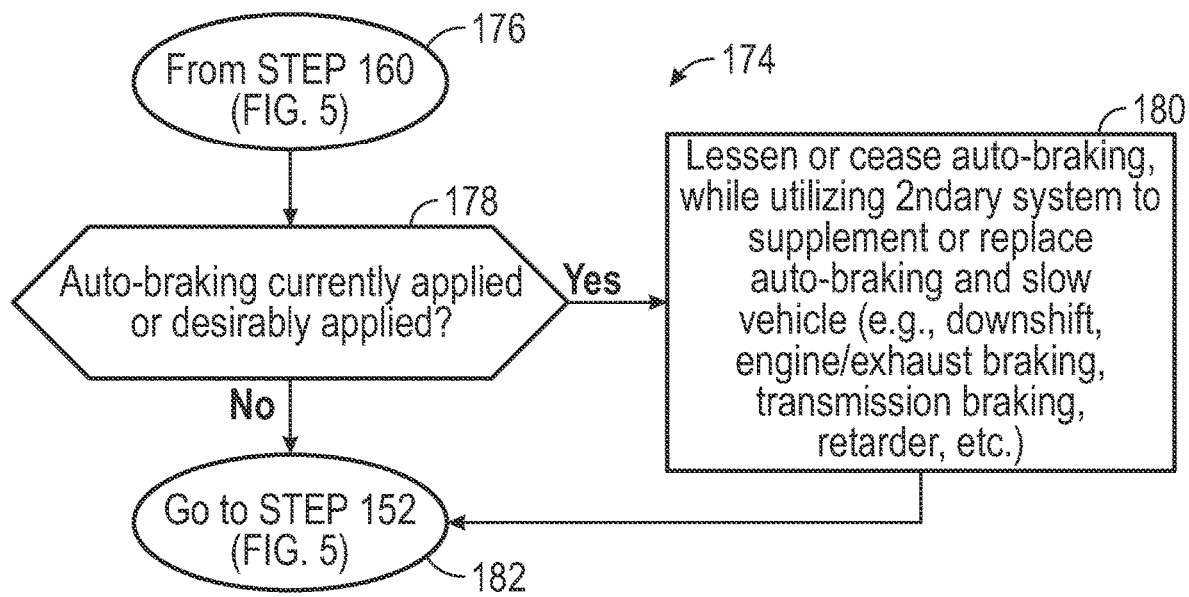
FIG. 7 is a flowchart of an example autobrake modification subprocess suitably carried-out in conjunction with the brake energy management process set-forth in FIG. 4 in embodiments of the present disclosure.

Addressing lastly brake overtemperature action 160 (FIG. 5), an autobrake modification subprocess can also be performed during step 150 of the brake energy management method 140 in embodiments of the present disclosure. An example of such an autobrake modification subprocesses 174 is shown in FIG. 7 and includes steps 176, 178, 180, 182. In this example, the processing subsystem 42 determines whether the autobraking function is currently active with autobraking applied (or desirably applied) to slow the work machine at the present juncture in time (step 178). If the answer to this query is "no," the processing subsystem 42 advances to step 154 of the method 140 (FIG. 5), as previously described. Otherwise, the processing subsystem 42 progresses to step 180 (FIG. 7) and modifies autobraking application to mitigate temperature rise within the friction brake mechanisms 54 by commanding the autobraking system (generally encompassed by the block entitled "hydraulic brake subsystem 30" and the associated processing components in such embodiments) to reduce the brake apply pressure of the friction brake mechanisms 54. The term "reduce," as appearing in this context, is defined to encompass a fractional or partial reduction in the brake apply pressure lessen the autobrake force provided utilizing the friction brake mechanisms 54, as well as complete cessation of the brake apply pressure to fully remove the autobrake force.

When applicable during step 180 of subprocess 174 (FIG. 7), and concurrently with lessening or temporarily ceasing the autobraking force, the processor subsystem 42 may also employ at least one secondary system or device onboard the work vehicle to supplement the removal of the autobraking force and bring about controlled work vehicle deceleration, as appropriate. For example, in embodiments, the processor subsystem 42 may perform one or more of the following actions: command downshifting of the work vehicle, utilize engine/exhaust braking, leverage a retarder device to slow the work vehicle, implement transmission braking, or otherwise control a secondary system onboard the work vehicle to compensate for the removal of, or the lessening of, the autobraking function. When the calculated or estimated brake temperature subsequently decreases to within an acceptable range (e.g., a predetermined amount or temperature differential below the lowest critical temperature stored in the memory 58), the processing subsystem 42 may then command the autobraking function to resume, if still desirable to reduce vehicle speed. Accordingly, through carrying-out the autobrake modification subprocess at step 150 of the larger method 140, the processor subsystem 42 may better determine appropriate levels and durations of autobrake application to prolong the usable lifespan of the work vehicle axle and brakes.

With continued reference to FIGS. 1-7, and referred specifically to FIGS. 5 and 7, the processor subsystem 42 of the brake energy management system 12 next advances to STEP 182 of the autobrake modification subprocess 174 (FIG. 7). This step of the autobrake modification subprocess 174 coincides with step 152 of the larger brake energy management method 140, as discussed above. Absent a determination by the processing subsystem 42 that the brake energy management method 140 should terminate at step 152 (FIG. 5), the brake energy management method 140 returns to step 144 and the above-described process steps repeat or loop. In this manner, by repeating the above-described steps in the present embodiment, the processing subsystem 42 continually estimates or tracks the internal brake temperatures of the friction brake mechanisms 54 (e.g., in real-time or near real-time) and conducts certain tailored actions when detecting brake overtemperature events depending upon, for example, the severity of the detected brake overtemperature event. Through the above-described brake overtemperature actions, proper machine operation can be encouraged (e.g., via the above-described visual notifications) to improve axle and braking system reliability. Work machine uptime may be boosted by better protecting brake health and reducing maintenance needs. Further, the above-described brake energy management processes, including processes similar or substantially identical to the autobrake modification subprocess 174 described above in connection with FIG. 7, may be leveraged in the context of fully or semi-autonomous work vehicles to refine braking control schemes to further maximize work vehicle uptime, productivity, and durability.

CONCLUSION

There has thus been provided brake energy or health management systems well-suited for usage onboard work vehicles. Embodiments of the brake energy management system provide management, prognostic, and/or protective functions to minimize work vehicle maintenance needs, improve axle reliability, and otherwise boost work vehicle uptime. In embodiments, prognostic data pertaining to brake overtemperature events may be stored in memory and tallied to better assess brake mechanism health and inform optimal maintenance practices, such as through refinement of service scheduling. So too may such data be sent to network-connected data centers to remotely track work vehicle brake health and provide customized service recommendations or modifications to the work vehicle servicing schedule. Notifications of brake overtemperature events and/or service recommendations may further be generated on display devices within the operator cabin of a given work vehicle to improve operator awareness of such overtemperature events and current brake health or capacity. In implementations in which a given work vehicle has an autobraking functionality, certain autobraking subprocesses may be carried-out by the processing subsystem of the brake energy management system to better preserve brake health through tailored modifications to brake apply pressures in conjunction with supplemental vehicle deceleration actions. Finally, in the context of fully and semi-autonomous work vehicles, such processing subsystems can leverage the processes described herein, as implemented through specialized algorithms executed onboard and/or offboard a given work vehicle, to improve operational commands relatively to vehicle braking to further maximize work vehicle uptime, productivity, and durability.

As utilized herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A brake energy management system onboard a work vehicle having a work vehicle axle, the brake energy management system comprising:
   an axle speed sensor configured to monitor a rotational speed of the work vehicle axle;
   at least one friction brake mechanism controllable to slow rotation of the work vehicle axle;
   a brake pressure sensor configured to provide data indicative of a brake apply pressure of the friction brake mechanism;
   a computer-readable memory; and
   a processing subsystem coupled to the axle speed sensor, to the brake pressure sensor, and to the computer-readable memory, the processing subsystem configured to:
      utilize data from the axle speed sensor and from the brake pressure sensor to detect brake overtemperature events during which an internal brake temperature of the friction brake mechanism exceeds at least a first critical temperature threshold stored in the computer-readable memory;

perform at least one predetermined brake overtemperature action in response to detection of a brake overtemperature event; and determine whether an autobraking system is presently automatically braking the work vehicle axle utilizing the friction brake mechanism and, if the autobraking system is automatically braking the work vehicle axle, command the autobraking system to reduce the brake apply pressure of the friction brake mechanism when the internal brake temperature of the friction brake mechanism exceeds at least the first critical temperature threshold.

2. The brake energy management system of claim 1, wherein the processing subsystem is configured to detect brake overtemperature events by:

utilizing data from the axle speed sensor to monitor a brake slip speed of the friction brake mechanism when applied to slow rotation of the work vehicle axle; and repeatedly estimating the internal brake temperature of the friction brake mechanism based, at least in part, on the brake slip speed and the brake apply pressure measured by the brake pressure sensor.

3. The brake energy management system of claim 2, further comprising a temperature sensor coupled to the processing subsystem and configured to monitor a temperature of a coolant circulated through the friction brake mechanism; and wherein the processing subsystem is configured to estimate the internal brake temperature of the friction brake mechanism further based on the temperature of the coolant circulated through the friction brake mechanism.

4. The brake energy management system of claim 3, wherein the processing subsystem is configured to estimate the internal brake temperature of the friction brake mechanism further based on a flow rate of the coolant circulated through the friction brake mechanism.

5. The brake energy management system of claim 1, further comprising a hydraulic pump that, when active, circulates coolant through the friction brake mechanism;

wherein the processing subsystem is configured to increase an output of the hydraulic pump to temporarily boost coolant flow through the friction brake mechanism when detecting a brake overtemperature event.

6. The brake energy management system of claim 1, further comprising an in-cabin display device operably coupled to the processing subsystem and located in an operator cabin of the work vehicle; and wherein, in response to detection of a brake overtemperature event, the processing subsystem is configured to generate a notification of the brake overtemperature event on the in-cabin display device.

7. The brake energy management system of claim 6, wherein the processing subsystem is configured to:

when detecting a brake overtemperature event, determine whether the internal brake temperature of the friction brake mechanism further exceeds a second critical temperature threshold stored in the computer-readable memory, the second critical temperature threshold greater than the first critical temperature threshold;

if determining that the internal brake temperature of the friction brake mechanism is greater than the first critical temperature threshold and less than the second critical temperature threshold, generate a low level notification of the brake overtemperature event on the in-cabin display device; and if determining that the internal brake temperature of the friction brake mechanism is greater than the second critical temperature threshold, generate a high level notification of the brake overtemperature event on the in-cabin display device.

8. The brake energy management system of claim 1, further comprising a wireless network interface coupled to the processing subsystem;

wherein, when detecting a brake overtemperature event, the processing subsystem is configured to utilize the wireless network interface to transmit data indicative the brake overtemperature event to a remote operations center over a communications network.

9. The brake energy management system of claim 1, wherein, when detecting a brake overtemperature event, the processing subsystem is configured to record data describing the brake overtemperature event into the computer-readable memory.

10. The brake energy management system of claim 1, wherein the processing subsystem is configured to command a secondary work vehicle system to slow the work vehicle, while concurrently reducing the brake apply pressure of the friction brake mechanism.

11. The brake energy management system of claim 1, wherein the processing subsystem is further configured to:

after commanding the autobraking system to reduce the brake apply pressure of the friction brake mechanism, determine if the internal brake temperature decreases below the first critical temperature threshold by a predetermined amount while autobraking is still desired; and reinstate full autobraking of the work vehicle if the internal brake temperature decreases below the first critical temperature threshold by the predetermined amount while autobraking is still desired.

12. A method carried-out by a processing subsystem included in a brake energy management system to detect brake overtemperature events for a work vehicle having a work vehicle axle, the brake energy management system including an axle speed sensor configured to monitor a rotational speed of the work vehicle axle, a friction brake mechanism controllable to slow rotation of the work vehicle axle, a brake pressure sensor configured to measure a brake apply pressure of the friction brake mechanism, and a computer-readable memory coupled to the processing subsystem, the method comprising:

utilizing data from the axle speed sensor to monitor a brake slip speed of the friction brake mechanism when applied to slow rotation of the work vehicle axle;

estimating an internal brake temperature of the friction brake mechanism as a function of the brake slip speed and the brake apply pressure measured by the brake pressure sensor;

determining whether the internal brake temperature exceeds a first critical temperature threshold stored in the computer-readable memory;

performing at least a first predetermined brake overtemperature action when determining that the internal brake temperature exceeds the first critical temperature threshold; and determining whether an autobraking system is automatically braking the work vehicle axle utilizing the friction brake mechanism, and if the autobraking system is automatically braking the work vehicle axle, commanding the autobraking system to reduce the brake apply pressure of the friction brake mechanism when the internal brake temperature of the friction brake mechanism exceeds at least the first critical temperature threshold.

13. The method of claim 12, further comprising commanding a secondary work vehicle system to slow the work vehicle concurrently with reducing the brake apply pressure of the friction brake mechanism.

14. The method of claim 12, further comprising:
after commanding the autobraking system to reduce the brake apply pressure of the friction brake mechanism, determining if the internal brake temperature decreases below the first critical temperature threshold by a predetermined amount while autobraking is still desired; and
reinstating full autobraking of the work vehicle if the internal brake temperature decreases below the first critical temperature threshold by the predetermined amount while autobraking is still desired.

15. The method of claim 12, further comprising generating a first visual notification of a brake overtemperature event on a display device associated with the work vehicle if the internal brake temperature exceeds the first critical temperature threshold.

16. The method of claim 15, wherein the first visual notification comprises a low level brake overtemperature alert; and
wherein the method further comprises generating a high level brake overtemperature alert on the display device if the internal brake temperature exceeds a second critical temperature threshold greater than the first critical temperature threshold.

17. The method of claim 12, wherein the brake energy management system further includes a wireless network interface; and
wherein the method further comprises transmitting data to a remote operations center utilizing the wireless network interface indicating when the internal brake temperature exceeds the first critical temperature threshold.

18. The method of claim 12, further comprising storing health data in the computer-readable memory when the internal brake temperature exceeds the first critical temperature threshold, the health data comprising a duration of time over which the internal brake temperature exceeded the first critical temperature threshold.

* * * * *